E. C. GUNDELACH.
INTERNAL COMBUSTION ENGINE.
APPLICATION FILED JUNE 12, 1915.

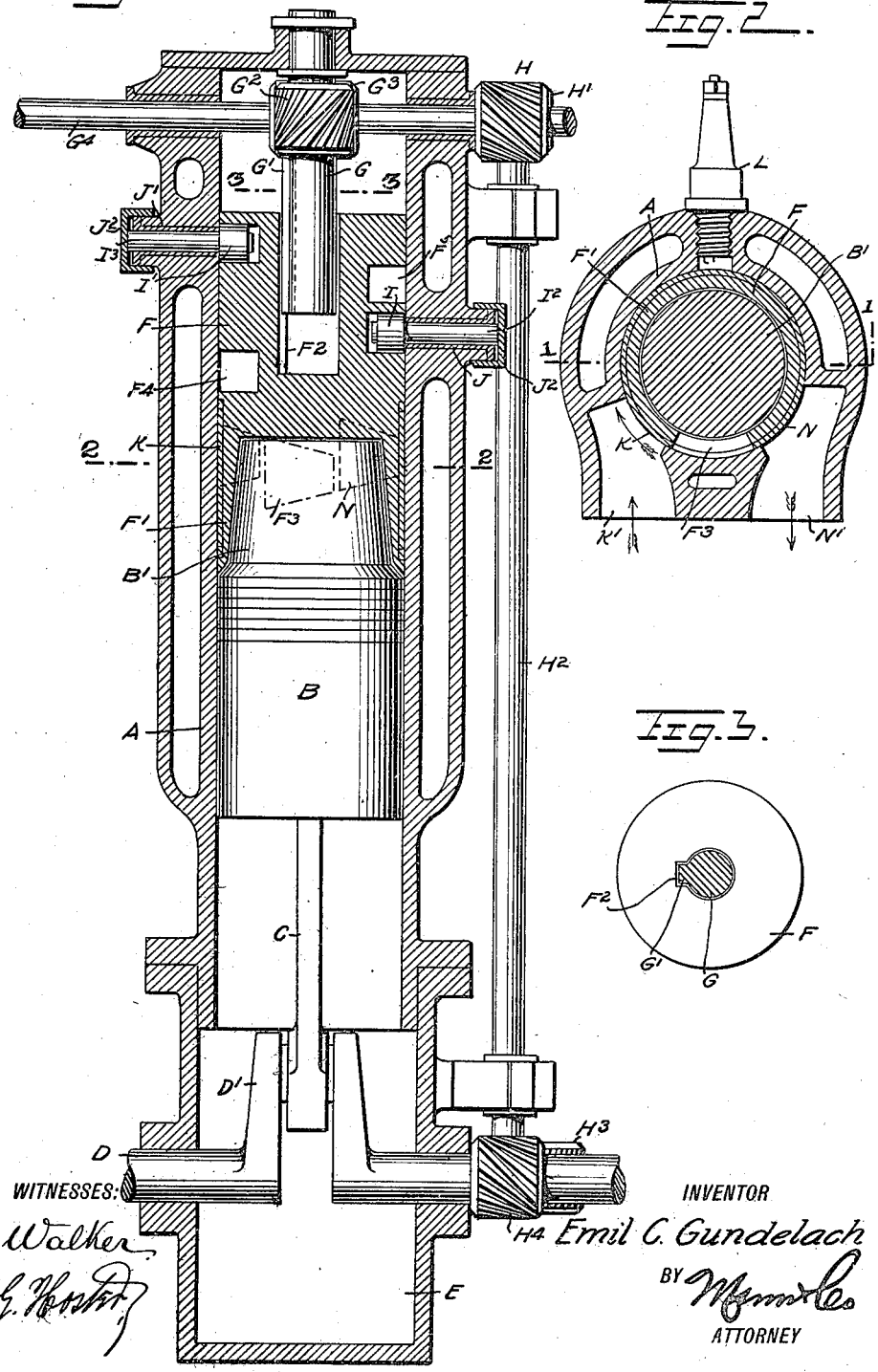

1,183,641.

Patented May 16, 1916.
2 SHEETS—SHEET 2.

INTAKE

COMPRESSION

EXPLOSION

END OF EXHAUST

WITNESSES:
H. J. Walker

INVENTOR
Emil C. Gundelach.
BY
ATTORNEY

UNITED STATES PATENT OFFICE.

EMIL C. GUNDELACH, OF NEW ROCHELLE, NEW YORK, ASSIGNOR OF ONE-HALF TO ROBERT J. EHLERS, OF NEW YORK, N. Y.

INTERNAL-COMBUSTION ENGINE.

1,183,641.　　　　Specification of Letters Patent.　　Patented May 16, 1916.

Application filed June 12, 1915. Serial No. 33,702.

*To all whom it may concern:*

Be it known that I, EMIL C. GUNDELACH, a citizen of the United States, and a resident of New Rochelle, in the county of Westchester and State of New York, have invented a new and Improved Internal-Combustion Engine, of which the following is a full, clear, and exact description.

The object of the invention is to provide a new and improved internal combustion engine arranged to insure a thorough exhaust of the products of combustion, to prevent the incoming new charge from mixing with any products of combustion, to provide ample admission space for the explosive charge, and to prevent accumulation of the carbon deposits in the cylinder and fouling of the electrodes of the igniting device.

In order to accomplish the desired result, use is made of a rotary valve mounted to rotate in the cylinder and to slide in the direction of the cylinder axis, the valve being open at the bottom to form a working chamber provided in its side wall with a single port adapted to register successively with an admission port, an igniting device and an exhaust port arranged on the cylinder, each port having parallel side walls and diverging connecting walls.

A practical embodiment of the invention is represented in the accompanying drawings forming a part of this specification, in which similar characters of reference indicate corresponding parts in all the views.

Figure 4:
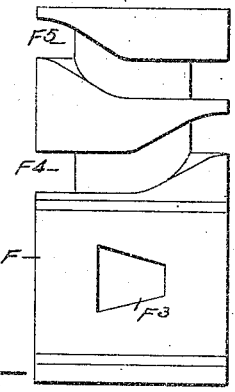
Figure 5:
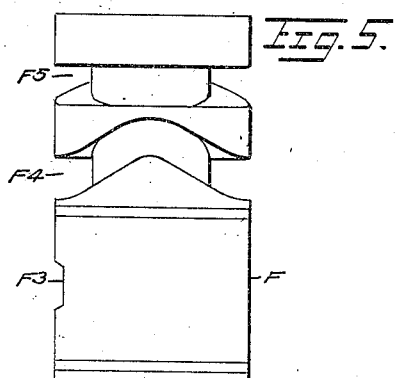

Figure 1 is a sectional side elevation of the internal combustion engine on the line 1—1 of Fig. 2; Fig. 2 is a sectional plan view of the same on the line 2—2 of Fig. 1; Fig. 3 is a sectional plan view of the rotary valve on the line 3—3 of Fig. 1; Figs. 4 and 5 are side elevations of the rotary valves in different positions; and Figs 6, 7, 8 and 9 are diagrammatic views of the several main positions of the rotary valve relative to the crank shaft of the engine.

In the cylinder A of the internal combustion engine reciprocates in the usual manner a piston B connected by a pitman C with the crank arm D' of the engine shaft D journaled in suitable bearings arranged on the crank case E, as plainly indicated in Fig. 1. In the upper portion of the cylinder A is mounted to rotate and to slide up and down a rotary valve F provided in its lower portion with a working chamber F' into which extends the upper reduced end B' of the piston B. The rotary valve F is driven by a driven valve shaft G centrally engaging the upper end of the valve F and connected with the same by a key G' engaging a keyway $F^2$ on the valve to rotate the latter on rotating the shaft G and to allow the valve to slide up and down, as hereinafter more fully explained. On the shaft G is secured a spiral gear wheel $G^2$ in mesh with a similar wheel $G^3$ secured on a shaft $G^4$ journaled in the upper portion of the cylinder A. The shaft $G^4$ is driven from the engine shaft D by any suitable means such, for instance, as shown in Fig. 1, and arranged as follows: In one outer end of the shaft $G^4$ is secured a spiral gear wheel H in mesh with a similar wheel H' secured to the upper end of a vertical shaft $H^2$ journaled in suitable bearings attached to the cylinder A and crank case E. On the lower end of the shaft $H^2$ is secured a spiral wheel $H^3$ in mesh with a spiral wheel $H^4$ attached to the engine shaft D. The gearing described is so proportioned that when the engine shaft D makes two revolutions the valve F makes one revolution.

The valve F is provided in the side wall of its working chamber F' with a port $F^3$ and the upper portion of the said valve is provided with two spiral grooves $F^4$, $F^5$ engaged by friction rollers I, I' held on shafts $I^2$ and $I^3$ journaled in suitable bearings J, J' arranged on the sides of the cylinder A. Caps $J^2$ cover the outer ends of the shafts $I^2$, $I^3$ and the bearings J, J'. The grooves $F^4$, $F^5$ are alike in shape and so arranged that an intermittent up and down sliding movement is given to the valve F on rotating the same from the valve shaft G, as previously explained.

The valve port $F^3$ is adapted to register successively with an admission port K, an igniting device L and an exhaust port N arranged on the cylinder in approximately the same horizontal plane. The ports K and N open into admission and exhaust chambers K' and N', respectively, of which the chamber K' is connected with a suitable source of fuel supply for conducting an explosive mixture into the chamber K'. From the exhaust chamber N' leads a pipe (not shown) to a suitable place of discharge. Each of the ports $F^3$, K and N has vertical side walls and diverging connecting walls so that the ports increase in size in the direction of the rotation of the valve, as will be readily understood by reference to Figs. 1 and 4 to 9.

Figure 6:
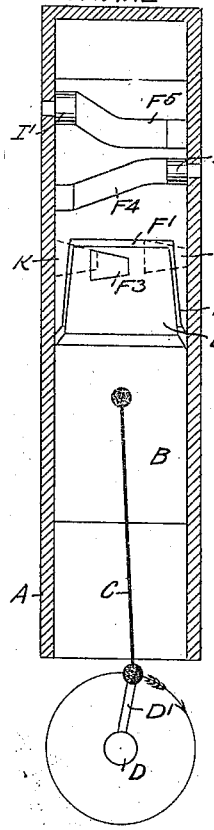
Figure 7:
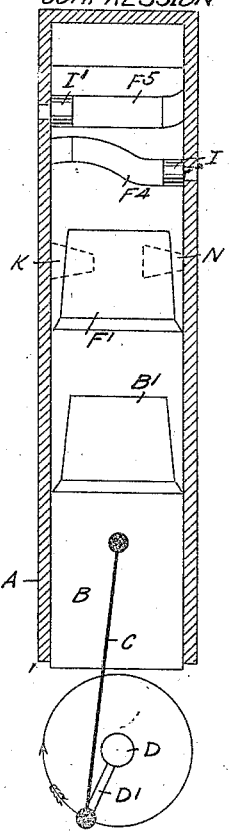
Figure 8:
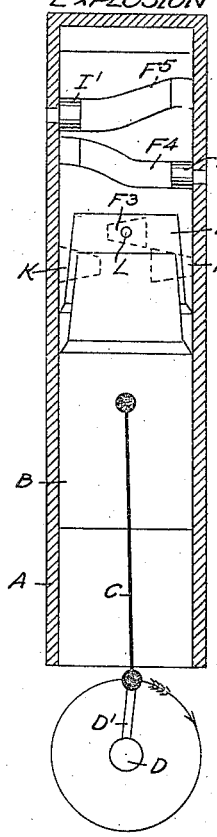
Figure 9:
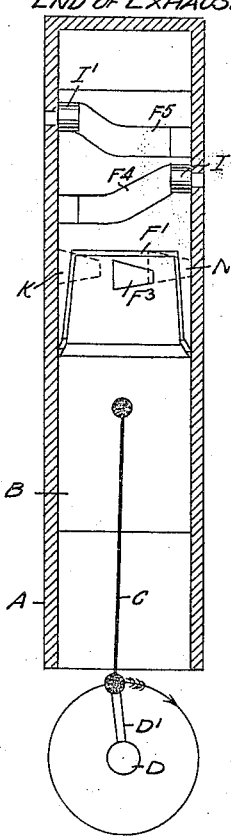

The operation is as follows: As shown in Figs. 1, 2 and 6, the valve F is in lowermost position and the piston B is in uppermost position with the port F³ just having closed the exhaust port N, the piston B now being on the downward intake stroke. The port F³ now moves gradually in register with the port K and as the piston descends the valve F moves upward so that the port F³ moves in full register with the port K at about the time the piston B is half way on its down stroke, and gradually moves out of register with the said port K at the time the piston reaches the end of its down stroke, thus making ample room for the explosive mixture to pass into the working chamber F'. The valve F remains in uppermost position during the next upward compression stroke and when the piston nears the end of its up-stroke then the port F³ registers with the ignition device L (see Fig. 8) and the explosive mixture is now ignited to force the piston B on the down power stroke. When the piston B reaches lowermost position the valve F is in uppermost position and during the next upward exhaust stroke of the piston the valve F moves downwardly and the port F³ gradually moves in register with the exhaust port N with which it is in full register at about the time the piston B is half way up on its upward exhaust stroke. During the remainder of the upward exhaust stroke the port F³ moves gradually out of contact with the port N and when the piston B reaches the end of its upward exhaust stroke then the valve F is in lowermost position (see Fig. 9). The above described operation is then repeated.

It will be noticed that the valve F has a turning and upward sliding motion during the time its port F³ moves into and out of register with the admission port K, and the valve has a turning and downward sliding movement during the time its port F³ moves into and out of register with the exhaust port N. By this arrangement provision is made to insure the admission of the desired amount of the explosive mixture and the complete discharge of the products of combustion. During the compression and power strokes the valve rotates only as the friction rollers I, I' travel in the horizontal portions of the grooves F⁴, F⁵.

It will be noticed that by the arrangement described the incoming new charge is prevented from mixing with any products of combustion and ample provision is made for the admission of the explosive charge.

It will further be noticed that the electrodes of the igniting device are not exposed for any length of time to the burning mixture in the working chamber F' as the port F³ is only temporarily in register with the igniting device and hence the electrodes are not liable to be fouled by the accumulation of carbon deposits.

From the foregoing it will be seen that provision is made for allowing a large amount of explosive mixture to pass into the cylinder thus increasing the efficiency of the engine. In practice, the valve has a sliding movement of about one-fourth of the stroke of the piston.

Having thus described my invention, I claim as new and desire to secure by Letters Patent:

1. An internal combustion engine, comprising a cylinder provided with an admission port and an exhaust port, an igniting device on the said cylinder, the said ports and igniting device being in approximately the same horizontal plane and the said igniting device being located intermediate the said ports, a piston reciprocating in the said cylinder and having a reduced upper end, and a rotary valve in the said cylinder and provided in its lower portion with a working chamber into which extends the upper end of the piston, the said valve having a single port adapted to register successively with the said inlet port, the said igniting device and the said exhaust port.

2. An internal combustion engine, comprising a cylinder provided with an admission port and an exhaust port, an igniting device on the said cylinder, the said ports and igniting device being in approximately the same horizontal plane and the said igniting device being located intermediate the said ports, a piston reciprocating in the said cylinder and provided with a single port adapted to register successively with the said inlet port, the said igniting device and the said exhaust port, each of the said ports having vertical end walls and diverging top and bottom walls to gradually increase the size of each port in the direction of the movement of the valve.

3. An internal combustion engine, comprising a cylinder provided with an admission port and an exhaust port, an igniting device on the said cylinder, the said ports and igniting device being in approximately the same horizontal plane and the said igniting device being located intermediate the said ports, a piston reciprocating in the said cylinder, a rotary valve in the said cylinder and provided with a single port adapted to register successively with the said inlet port, the said igniting device and the said exhaust port, means for rotating the valve, and means for imparting an intermittent sliding movement to the valve in the direction of its axis.

4. An internal combustion engine, comprising a cylinder provided with an admission port and an exhaust port, an igniting device on the said cylinder, the said ports and igniting device being in approximately the same horizontal plane and the said igniting device being located intermediate the said ports, a piston reciprocating in the said cylinder and a valve mounted to rotate and to slide up and down in the said cylinder, the said valve having its lower end provided with a working chamber into which extends the upper end of the said piston, the wall of the said working chamber being provided with a single port adapted to register successively with the said inlet port, the said igniting device and the said exhaust port.

5. An internal combustion engine, comprising a cylinder provided with an admission port and an exhaust port, an igniting device on the said cylinder, the said ports and igniting device being in approximately the same horizontal plane and the said igniting device being located intermediate the said ports, a piston reciprocating in the said cylinder, a rotary valve in the said cylinder and having its lower end provided with a working chamber into which extends the upper end of the said piston, the wall of the said working chamber being provided with a single port adapted to register successively with the said inlet port, the said igniting device and the said exhaust port, the said valve having in its peripheral face a spiral groove located above the working chamber, a friction roller held on the cylinder and engaging the said spiral groove, and a vertical driven shaft having a sliding and driving connection with the said valve to rotate the latter and to allow the valve to slide on the shaft.

6. An internal combustion engine, comprising a cylinder provided with an admission port and an exhaust port, an igniting device on the said cylinder, the said ports and igniting device being in approximately the same horizontal plane and the said igniting device being located intermediate the said ports, a piston reciprocating in the said cylinder, a rotary valve in the said cylinder and having its lower end provided with a working chamber into which extends the upper end of the said piston, the wall of the said working chamber being provided with a single port adapted to register successively with the said inlet port, the said igniting device and the said exhaust port, each of the said ports having vertical end walls and diverging top and bottom walls to gradually increase the size of each port in the direction of the movement of the valve, the said valve having in its peripheral face a spiral groove located above the working chamber, a friction roller held on the cylinder and engaging the said spiral groove, and a vertical driven shaft having a sliding and driving connection with the said valve to rotate the latter and to allow the valve to slide on the shaft.

7. An internal combustion engine, comprising a cylinder provided with an igniting device and having an admission port and an exhaust port, a piston reciprocating in the said cylinder, an engine shaft connected with the piston, a rotary valve in the upper part of the cylinder and mounted to rotate and to slide up and down, the said valve having a working chamber in its lower portion into which the said piston extends, the valve being provided with a single port adapted to register successively with the said inlet port, the igniting device and the exhaust port, means driven from the engine shaft for rotating the said valve and means for imparting an intermittent up and down sliding movement to the valve on rotating the same.

In testimony whereof I have signed my name to this specification in the presence of two subscribing witnesses.

EMIL C. GUNDELACH.

Witnesses:
THEO. G. HOSTER,
PHILIP D. ROLLHAUS.